July 7, 1925.

J. F. PANYARD

PISTON PACKING

Filed Oct. 3, 1923

INVENTOR.
John F. Panyard
BY Ralzemond A. Parker
ATTORNEY.

July 7, 1925.
J. F. PANYARD
PISTON PACKING
Filed Oct. 3, 1923
1,545,275
2 Sheets-Sheet 2
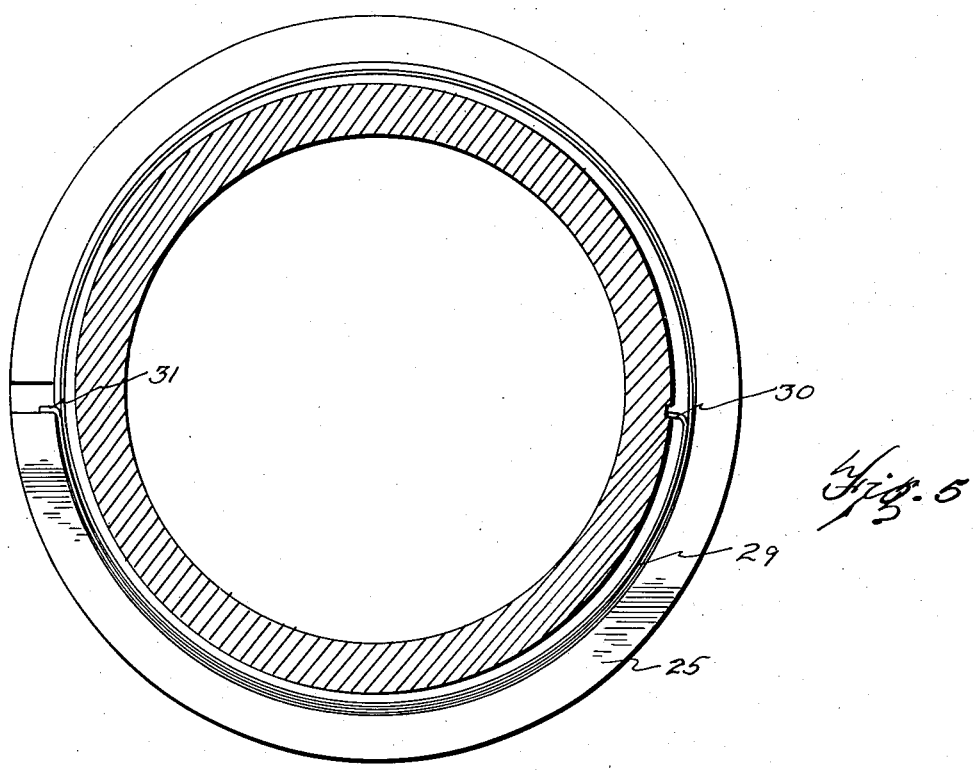
Fig. 5
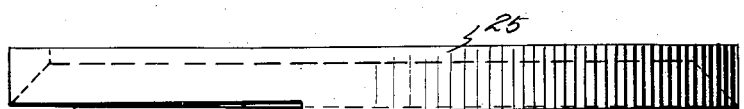
Fig. 6
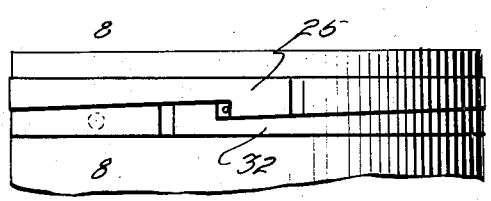
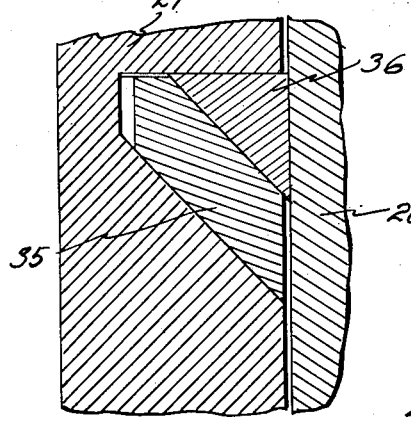
Fig. 9
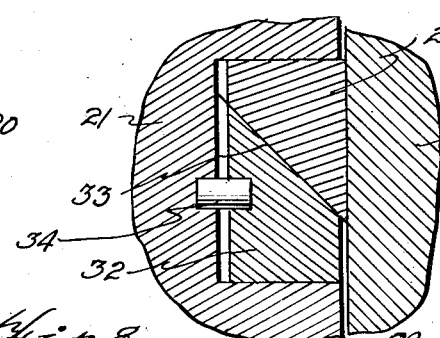
Fig. 8
Fig. 7
INVENTOR.
John F. Panyard
Raymond A. Parker
ATTORNEY.

Patented July 7, 1925.

1,545,275

UNITED STATES PATENT OFFICE.

JOHN F. PANYARD, OF DETROIT, MICHIGAN.

PISTON PACKING.

Application filed October 3, 1923. Serial No. 666,298.

*To all whom it may concern:*

Be it known that I, JOHN F. PANYARD, a citizen of the United States, residing at Detroit, county of Wayne, State of Michigan, have invented a certain new and useful Improvement in Piston Packings, and declare the following to be a full, clear, and exact description of the same, such as will enable others skilled in the art to which it pertains to make and use the same, reference being had to the accompanying drawings, which form a part of this specification.

My invention relates to improved piston packing and piston construction.

An efficient piston packing should maintain compression in the cylinder within which the piston is working, assist the lubrication without pumping the lubricant, and accomplish these results without undue wall pressure against the cylinder, and in addition the packing should stabilize the piston in the cylinder and prevent what is commonly termed piston slap, and therefore, it is desirable that the packing, while adjustable to fit the diameter of the cylinder, seat firmly at all times against the piston.

It has heretofore been the practice to provide packing rings disposed in peripheral packing receiving grooves in the piston held yieldingly outwards against the cylinder wall either by inherent or auxiliary spring tension or by gas expansion. Some constructions were of such a character that the packing was also held axially against the side walls of the groove. Such constructions not only call for play of the packing relative the piston but provide a resilient medium intervening the piston and packing to hold the latter yieldingly outwards against the cylinder wall and may be characterized as employing a piston having a yielding seat for the packing, which seat is commonly in the form of an auxiliary spring intervening the piston and packing but may consist of a layer of expansive gases between the packing and piston or reside in the inherent expansive character of the packing rings.

I provide a packing adjustable relative the piston to fit the bore of the cylinder, yet seated firmly radially and axially against the piston to stabilize its operation in the cylinder. It is a purpose of my invention to provide a piston with a rigid supporting seat for packing, which packing is movable for adjustment to the bore of the cylinder but upon which it is firmly seated at all times, and an important object is the provision in a piston of a packing groove having a rigid seating face for the packing over which the packing may travel radially and axially to compensate for varying cylinder bore dimensions.

A meritorious feature of construction is the employment in a piston of a packing groove having a rigid tapered beveled seating face for packing upon which is firmly yet adjustably seated a suitable packing ring having a helical beveled face contacting the beveled face of the groove, said ring held yieldingly against the cylinder wall while seating firmly against the supporting face of the piston.

In the drawings,—

Fig. 5 is a horizontal sectional view through a piston provided with my improved packing.

Fig. 6 is a side elevation of one form of my improved packing ring.

Fig. 7 is a fragmentary side elevation of a piston carrying a modified form of my packing.

Fig. 8 is a cross-sectional view taken on line 8—8 of Fig. 7.

Fig. 9 is a fragmentary sectional view through a piston carrying another modified form of my packing.

Figure 1:
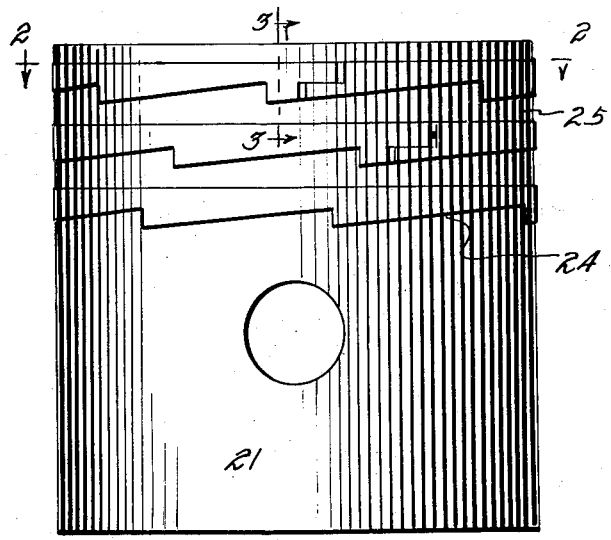
Figure 1 is a side elevation of the piston provided with my improved packing.
Figure 3:
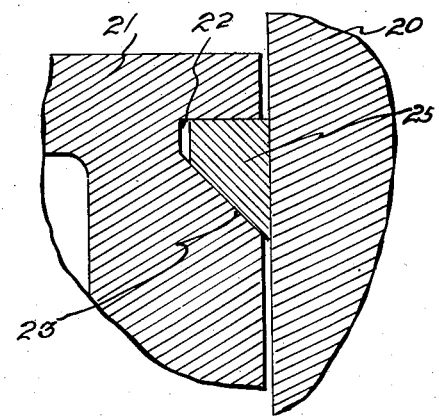
Fig. 3 is a fragmentary vertical sectional view taken on line 3—3 of Fig. 1.

In the drawings, let 20 indicate a cylinder wall and 21 a piston disposed to work in the cylinder. This piston is provided with peripheral packing grooves 22 of the form usually provided except that the packing groove is provided with an outwardly beveled helical side wall portion. In Fig. 3 the bevel of the side wall portion is clearly indicated at 23. This beveled side wall may be helical throughout its entire length as would be the case if the ring shown in Fig. 6 were employed or it may consist of a plurality of tapered steps 24, as is illustrated in Fig. 1.

I provide a packing ring 25 with a beveled helical inner face 26 to seat on the beveled side wall of the groove to support the ring radially and axially. The ring, of course, is beveled and tapered to correspond with the bevel and taper of the side wall of the groove and is illustrated as a one-piece resilient split ring section.

Figure 2:
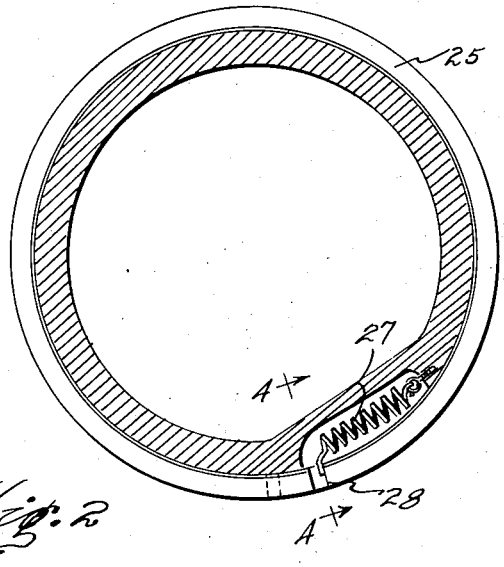
Fig. 2 is a cross-sectional view taken on line 2—2 of Fig. 1.
Figure 4:
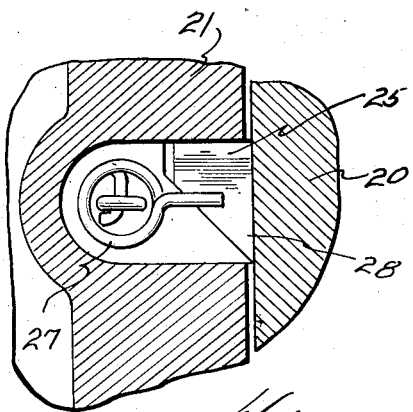
Fig. 4 is a fragmentary cross-sectional view taken on line 4—4, Fig. 2.

In Figs. 1 to 6, I have shown the packing as comprising a single ring section consisting of a packing ring having either a single helical face or a succession of stepped helical faces. In these views I have shown two types of springs adapted to exert rotatable pressure on the packing ring counter the helical face thereof to hold the ring to fill the groove axially at all times. In Figs. 2 and 4, I show a coil spring 27 secured at one end to the piston and engaging at the opposite end in the split 28 of the ring to exert rotatable pressure thereon counter the tapered face of the rings. In Fig. 5, I show a spring 29 coiled about the piston in the bottom of the groove underneath the ring 25 and turned inwardly at one end as at 30 into a notch in the bottom of the groove and outwardly at the other end as at 31 into the split of the ring to exert rotatable pressure on the ring.

The ring is of such a cross-sectional dimension as to substantially fill the gap of the groove in the piston and to extend outwardly beyond the outer face of the piston to contact the cylinder wall. The ring is rigidly supported axially and radially by the piston while contacting the cylinder wall and the opportunity for relative movement which might result in piston slap is reduced to a minimum.

In Figs. 7 and 8, I have illustrated my invention as embodied in a construction suitable for disposition in the conventional straight side packing groove. To obtain the result illustrated in the constructions shown in the first five figures of the drawings, I provide in the groove, an annular member 32 having an outwardly beveled helical face 33 which member is rigidly secured in the groove in a suitable manner as by means of a pin 34. This provides a firm beveled helical side wall within the groove corresponding to the side wall 23 illustrated in Fig. 3, upon which the correspondingly beveled inner face of the ring section 25 seats to provide a firm support for the ring.

In Fig. 9 my packing ring is constructed in two sections, a large section 35 which corresponds to the ring 25 in that it has an inner beveled helical face to seat on the beveled helical wall of the groove, and a small section 36 which is wedge-shaped in cross-section and seats on the beveled outer face of the large section projecting outwardly beyond the outer face thereof to contact the cylinder wall. This small section 36 is preferably of larger cross-sectional area than the portion that would be removed from the blank from which the large ring section 35 was formed to make the beveled face on which the small ring section seats. There is, therefore, a wedging action between the ring sections 35 and 36 in addition to the action heretofore described in connection with the packing construction described in the first six figures of the drawing.

Suitable springs will be provided to exert rotatable pressure on the movable ring sections illustrated in modified forms of my construction.

My packing, therefore, while held under expansible pressure to fit the bore of the cylinder, yet seats at all times firmly upon the piston and the piston is held to travel in the cylinder without wobble or piston slap and its movement is stabilized.

What I claim is:

1. In piston packing, a piston provided with a packing groove having an outwardly beveled helical wall, a packing ring in said groove having a helical beveled face contacting said wall so that the ring is supported axially and radially thereon.

2. In piston packing, a piston having a groove for packing provided with a helical outwardly beveled side wall, a ring in said groove having a helical beveled inner face movably seated on the wall of the groove.

3. In piston packing, a piston having a packing groove provided with an inclined side wall which extends angularly radially circumferentially relative the opposite side wall, a packing ring movable in said groove having an inner face inclined to correspond with the inclined side wall of the groove and seated thereon.

4. In piston packing, a piston having a packing groove provided with a helical outwardly beveled side wall portion, a packing ring rotatable in said groove having a helical beveled inner face seating on the beveled wall of the groove, said ring held under constraint rotatably.

5. In piston packing, a piston provided with a packing groove having a plane circular side wall and an outwardly beveled helical opposite side wall, packing in said groove comprising a ring having a helical beveled inner face supported on the beveled wall of the groove, and a spring member in the groove exerting rotatable pressure on the ring.

6. In piston packing, a piston provided with a packing groove having a beveled helical side wall to support axially and radially a packing ring, a packing ring disposed within the groove having a face corresponding to the beveled helical wall of the groove and supported thereon to substantially fill the groove axially and extend outwardly beyond the surface of the piston.

7. In piston packing, a piston provided with a packing groove having an inclined helical side wall, a packing ring in said groove having an inclined helical inner face seating on the inclined side wall of the groove to support the ring axially and radially within the groove, which ring is of such a cross-sectional area as to substantially fill the groove and extend outwardly radially beyond the piston, and means engaging the ring to exert rotatable pressure thereon.

8. In piston packing, in combination with a cylinder, a piston movably disposed therein having a packing groove provided with a rigid helical beveled supporting face for packing, a packing ring in said groove having a helical beveled face seated on the helical beveled supporting face in the groove held outwardly against the cylinder wall and under restraint to produce rotation within the groove.

In testimony whereof, I sign this specification.

JOHN F. PANYARD.